United States Patent
De Bonis et al.

(10) Patent No.: US 8,433,301 B2
(45) Date of Patent: Apr. 30, 2013

(54) METHOD AND SYSTEM FOR AUTOMATICALLY PROVIDING CONTENTS FROM A SERVICE PROVIDER TO A MOBILE TELEPHONIC TERMINAL

(75) Inventors: Roberto De Bonis, Turin (IT); Rosario Drogo De Iacovo, Turin (IT); Anna Maria Fiammengo, Turin (IT); Pierfranco Rodi, Turin (IT)

(73) Assignee: Telecom Italia S.p.A., Milan (IT)

( * ) Notice: Subject to any disclaimer, the term of this patent is extended or adjusted under 35 U.S.C. 154(b) by 963 days.

(21) Appl. No.: 12/086,386

(22) PCT Filed: Dec. 14, 2005

(86) PCT No.: PCT/EP2005/013440
§ 371 (c)(1),
(2), (4) Date: Sep. 16, 2008

(87) PCT Pub. No.: WO2007/068268
PCT Pub. Date: Jun. 21, 2007

(65) Prior Publication Data
US 2009/0117925 A1    May 7, 2009

(51) Int. Cl.
*H04L 29/06* (2006.01)

(52) U.S. Cl.
USPC ............... 455/414.3; 455/414.2; 455/566; 455/418; 455/406

(58) Field of Classification Search ............... 455/414.3, 455/414.2, 566, 418, 406; 725/46, 42, 140; 705/774; 709/206, 227
See application file for complete search history.

(56) References Cited

U.S. PATENT DOCUMENTS

| | | |
|---|---|---|
| 2002/0103908 A1 | 8/2002 | Rouse et al. |
| 2003/0105864 A1 | 6/2003 | Mulligan et al. |
| 2003/0232616 A1 | 12/2003 | Gidron et al. |
| 2004/0003402 A1* | 1/2004 | McKenna, Jr. ............. 725/46 |
| 2004/0015567 A1* | 1/2004 | Ziebold et al. ............. 709/219 |
| 2004/0181550 A1 | 9/2004 | Warsta et al. |
| 2005/0039136 A1* | 2/2005 | Othmer ............. 715/774 |
| 2005/0073999 A1* | 4/2005 | Koch ............. 370/352 |

FOREIGN PATENT DOCUMENTS

| | | |
|---|---|---|
| WO | WO 2004/036458 A2 | 4/2004 |
| WO | WO 2004/095794 A1 | 11/2004 |
| WO | WO 2005/109931 A1 | 11/2005 |

* cited by examiner

*Primary Examiner* — Kiet Doan
*Assistant Examiner* — Dung Lam
(74) *Attorney, Agent, or Firm* — Finnegan, Henderson, Farabow, Garrett & Dunner, L.L.P.

(57) ABSTRACT

A method and a system are adapted to automatically provide contents, particularly multimedia contents, to mobile telephonic terminals of service subscribers; service subscription agreements information are stored in a repository of a service provider for each subscriber; and this information includes service conditions desired by each subscriber; such service conditions including specification of contents desired by each subscriber. Contents are provided to mobile telephonic terminals in push mode according to the conditions desired by each subscriber.

22 Claims, 5 Drawing Sheets

METHOD AND SYSTEM FOR AUTOMATICALLY PROVIDING CONTENTS FROM A SERVICE PROVIDER TO A MOBILE TELEPHONIC TERMINAL

CROSS REFERENCE TO RELATED APPLICATION

This application is a national phase application based on PCT/EP2005/013440, filed Dec. 14, 2005.

FIELD OF THE INVENTION

The present invention relates to a method and a system for automatically providing contents, particularly multimedia contents, by a service provider to a mobile telephonic terminal of a user.

BACKGROUND OF THE INVENTION

Nowadays, mobile telephones may be used not only for telephone conversation between users but also for sending and receiving messages (e.g. SMS, MMS, . . . ).

Some telephone operators have already thought to use the messaging technologies to provide information to the users.

For example, TIM [Telecom Italia Mobile] sends news to subscribers through SMS or MMS messages using information provided by ANSA, a press agency; different predefined news services are provided dedicated to different kinds of news. These services provide to transmit some SMS or MMS messages to a subscriber every day up to a predetermined maximum number; messages are transmitted according to the internal service logic.

From patent application WO 2004/036458, there is known a method of presenting media content to a user or group of users wherein the media content resides on a storage system. The method comprises the steps of: (a) defining a query to retrieve the media content, which query is appropriate for the user's situation by using context information, (b) retrieving the queried media content from the storage system, and (c) resending the queried media content to the user or group of users.

From patent application US 2002/103908, there is known a system and method for enabling users to send and receive messages and other information from mobile devices and enabling users to access server-based information using mobile devices over wireless data networks. The system and method enable users to customize information that is received and sent from mobile devices. For example, the user may select to receive emails (or other correspondences) from a particular individual or group of individuals. The user may also select to receive a particular type or types of emails (or other correspondences), such as the ones marked as high priority or otherwise designated as being important. In addition, the user may customize responses, replies and other outgoing information from the user's mobile device. Mobile device users may also customize various aspects of views and applications. Examples of customizable options include home page, time zone, date format, font format, language.

From patent application WO 2004/095794, there is known a client-server system and method wherein multimedia service contents are provided to user terminals in a wireless communication network, such as a GPRS or UMTS network, by generating delivery packets that convey both the multimedia service contents and a corresponding service logic. These delivery packets are received and interpreted by means of an interpreter at the user terminals (client) to obtain presentation of the multimedia service contents and the interaction level between client and server according to the corresponding service logic. The multimedia contents can thus be presented interactively at the terminal, while new services can be designed on the server side and made available to the user terminals without modifications being required on the terminal side.

SUMMARY OF THE INVENTION

Applicant has observed that users are interested in receiving contents, particularly multimedia content, through simple and customized solutions.

Applicant has further observed that the above described commercial solutions are not fully satisfactory for users, especially for demanding users, as they do not provide the users with the possibility to customize the service.

The above described patent solutions are not sufficiently simple or face only specific problems.

It is the general object of the present invention to provide a method for automatically providing contents, particularly multimedia contents, by a service provider to a mobile telephonic terminal of a user.

It is a further object of the present invention to provide a method and system of the above type that easily and flexibly match different requests by different users, particularly in terms of types of contents but also in terms of aggregation format and presentation format.

The present invention considers an environment where a plurality of contents providers make available contents, particularly multimedia contents, of different types. Additionally, such contents is often changed as time passes. Such contents may be made available by contents providers as one or more files, often known as "feeds" or "Web feeds"; preferably, such contents is provided according to a uniform syndication standard based e.g. on XML/RDF language (such as RSS or Atom); some contents providers may update their feeds periodically (i.e. through a substantially synchronous update) while other contents providers may update their feeds only repeatedly (i.e. through a asynchronous update); it may happen that the same contents provider has different update strategies for different feeds. Users, are often interested in receiving contents of various specific types typically for a certain period of time; different users are usually interested in receiving different contents. Additionally, different users are usually interested in receiving contents at different time (e.g. date and/or hour), according to different presentation formats and, in general, at different conditions.

The present invention concentrates in the provision of contents to mobile telephonic terminals, typically mobile phones.

In this case, it has been considered by the Applicant that "push mode" is the best approach; in other words, the user of the mobile telephonic terminal is not required to take any step for receiving contents and his terminal receives contents automatically; in particular, reception is realized through communication between a server process active within the system of the service provider and a client process active within the terminal of the user.

In order to receive the desired contents, according to the present invention, a user has a service subscription agreement with the service provider, the system according to the present invention allows a user to specify in his service subscription agreement at least the contents (e.g. the feeds and the corresponding content providers) he is interested in and preferably also information regarding to aggregation format and presentation format and reception time; the system stores for each subscriber a service subscription agreement.

Thereafter, the system according to the present invention automatically sends the desired contents to the subscriber in the form of messages (preferably variable-length messages), in an aggregated format and according to the requests of the subscriber.

Independently from the dispatch of messages, the system automatically collects contents from the contents providers.

According to the present invention, an interface is advantageously provided to users by the system through the Web using typically HTTP protocol; additionally, it may be provided that also WAP protocol (or any other mobile communication interface) can be used for interacting with the system through e.g. mobile phones. Through this interface, a user is able to create his own "multimedia programme" by selecting a set of sources, e.g. feeds, of his own interest; these sources are made available by the system. For these sources, a user can specify, e.g., both the way in which they have to be aggregated for producing the programme, how they should be presented and the time at which they have to be received by the user's terminal. The system is able to determine when the data transfer between the system and the terminal can take place; the system may also take into account a set of policies depending on the subscription type and/or on the network data traffic load (especially for mobile networks).

Dispatch mode may be of the "programmed" type (i.e. according to what has been requested by the user) or of the "as soon as possible" type (i.e. whenever new contents of interest for a user is identified).

The present invention will be better described in the following with reference to a preferred and non-limitative embodiment and in conjunction with the annexed drawings.

It is to be understood that the following description and the annexed drawings are not to be interpreted as limitations of the present invention but simply as exemplifications.

DETAILED DESCRIPTION OF THE INVENTION

Figure 1:
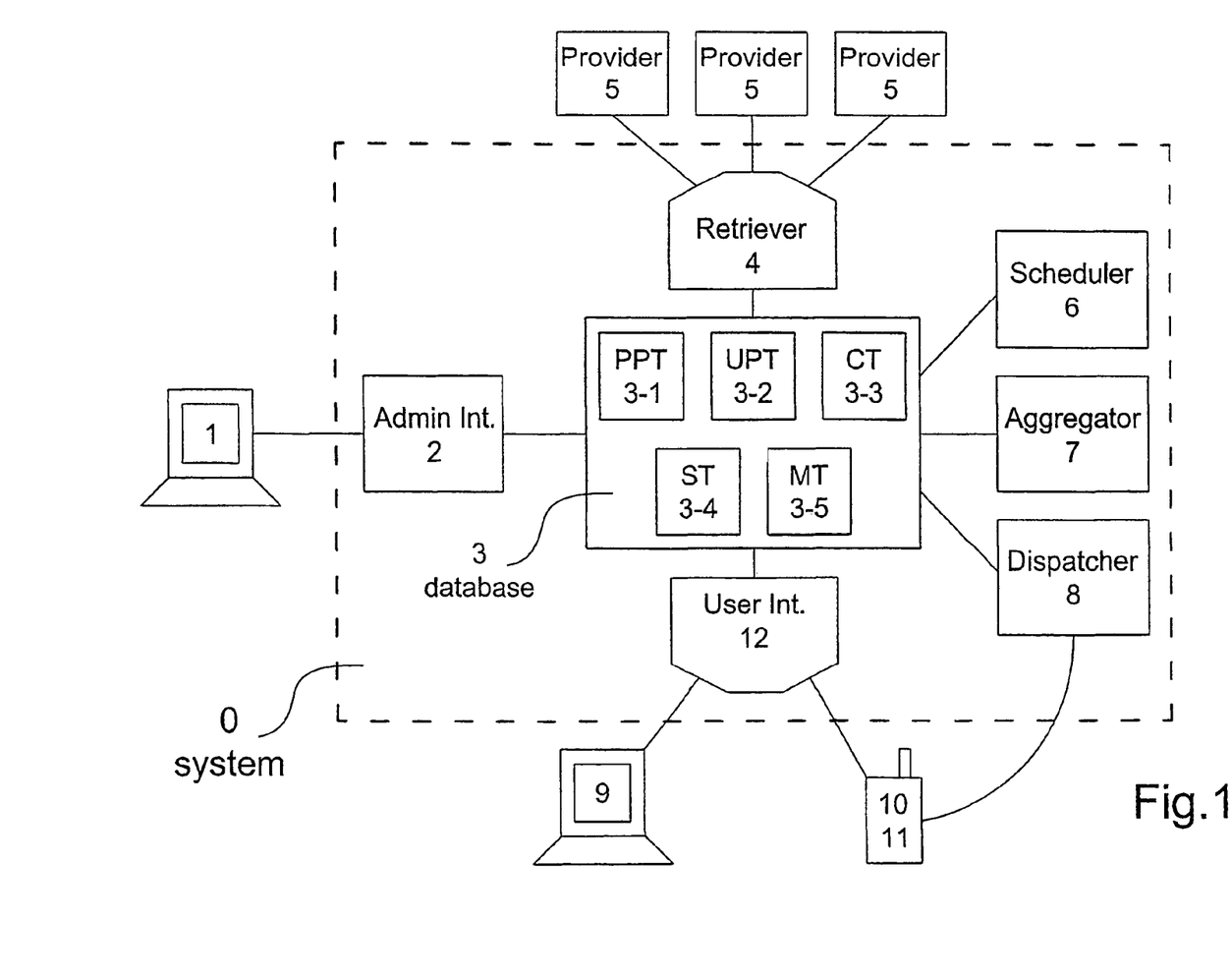
FIG. 1 shows a simplified block diagram of a system according to an embodiment of the present invention.

FIG. 1 shows a system, according to a preferred embodiment of the present invention, connected to some external entities; it can be noted that only the main components of the system are shown in FIG. 1.

In FIG. 1, the system is indicated with reference 0 and is delimited by a dashed line; the system is connected to a set of contents providers 5, a fixed computer terminal 1 (e.g. a PC, i.e. a Personal Computer) for an administrator of system 0, a fixed computer terminal 9 (e.g. a PC) for a user/subscriber of system 0 and a mobile telephonic terminal 10 (e.g. a cellular phone) for a user/subscriber of system 0.

System 0 is hosted by a service provider. It may happen that an entity acts e.g. as both a service provider and a contents provider, or as both a service provider and a telephonic operator, or as both a service provider and a contents provider and a telephonic operator; in these cases, typically, the different functions are carried out by different and separate systems.

According to the specific embodiment of FIG. 1, system 0 comprises a set of modules (typically software modules) and a single repository, indicated with reference 3; repository 3 is realized as a database comprising a set of tables and is managed by system 0.

The modules of system 0 include:
- a User Interface Module, UIM, indicated with reference 12;
- an Administrator Interface Module, AIM, indicated with reference 2;
- a Contents Retriever Module, CRM, indicated with reference 4;
- a Scheduler Module, SM, indicated with reference 6;
- a Contents Aggregator Module, CAM, indicated with reference 7;
- a Dispatcher Module, DM, indicated with reference 8.

The tables of database 3 include:
- a Provider Profiles Table, PPT, indicated with reference 3-1;
- a User Profiles Table, UPT, indicated with reference 3-2;
- a Contents Table, CT, indicated with reference 3-3;
- a Subscriptions Table, ST, indicated with reference 3-4;
- a Messages Table, MT, indicated with reference 3-5.

According to the specific embodiment of FIG. 1, the above mentioned software modules are embodied in corresponding processes when the system is implemented and operating in a single computer or in a network of computers; in general, each of these software modules may generate one or more processes.

These processes read data from database 3 and write data into database 3. In the preferred embodiment of FIG. 1, the processes do not communicate directly between them, but they use database 3 for inter-process communication.

The processes described in the following behave as follows: accessing the database for reading information, executing the process logic, accessing the database for writing information, idle state. This is the general operation; anyway, some processes may follow a more complex operation in which instead of a simple fixed-length idle state the process computes the refresh time intervals of the feeds and/or synchronize with other processes.

In the embodiment of FIG. 1, contents (particularly multimedia contents) of various types are made available by contents providers 5 as "feeds".

Terminal 10 is used by a user for receiving contents (particularly multimedia contents) of various types.

Contents made available by a contents provider typically changes during time and therefore a user is interested in being updated about new contents and eventually receiving it.

System 0 enables a user to automatically receive contents of his own interest in an aggregate way and according to his own needs and preferences.

As regards contents publication, contents providers 5 have to make available their contents in a standard and uniform way in order to be easily manageable by system 0. Otherwise, for each contents provider, system 0 should know the publication method and should transform contents in a homogeneous format; anyway, in this case, it is laborious to add further contents providers. Preferably, system 0 provides that contents providers 5 use a contents syndication standard (e.g. RSS or Atom).

Information regarding publication methods are stored in database 3, specifically in Provider Profiles Table 3-1; this information may comprise e.g. the standard used for creating the XML files (describing the published contents), the links for finding these XML files, the update frequency of these XML files (e.g. periodical update or immediate update). The information stored in database 3 match the data structure defined through the contents syndication standard.

System 0 is managed by means of terminal 1 through interface module 2. Administration of the system is carried out by at least one individual, i.e. the administrator. The administrator is generally charged by the service provider to manage (administratively and technically) system 0.

The administrator has the possibility to define the sources of contents, i.e. contents providers, from which contents is obtained in order to be provided to interested users and to input contents providers profiles.

Interface module 2 is a component of system 0 that allows the administrator to access system 0; preferably, the administrator access system 0 remotely through for example an internet wired connection.

Interface module 2 allows the administrator, among other things, to input information relating to contents providers profiles; this information is stored in Provider Profiles Table 3-1.

A contents provider profile may comprise e.g. name, Web address, logo, etc. of the contents provider and, furthermore, information regarding the type or types of the provided contents (e.g. news, sport, movies), where are the contents published (Web address or addresses of the XML file or files describing them) and other detail information on the published contents (e.g. media formats used, average size of the various multimedia contents).

Additionally, interface module 2 allows the administrator not only to input but also to update and query the contents providers information (previously input) stored in table 3-1.

Finally, interface module 2 allows the administrator to pre-define service subscription profiles as it will explained in the following; a service subscription profile typically specifies the contents bouquet (i.e. the types of contents to be transmitted), the aggregation format, the presentation format, the dispatch mode, etc.

System administration interfaces are known in the art and therefore no further details will be provided herein.

According to the present invention, a user has a service subscription agreement with the service provider; based on this agreement, the user, namely the subscriber, receives on his mobile telephonic terminal contents.

Service subscription agreements are stored in database 3, specifically in Subscriptions Table 3-4.

The system according to the present invention is designed to be very flexible; the conditions (or parameters) of the service subscription agreements may be determined (and specified to the system) fully or partially by the user before "signing" the service subscription agreement; these conditions may comprise e.g. the contents bouquet (i.e. the types of contents to be transmitted), the aggregation format, the presentation format, the dispatch mode, etc.

The contents bouquet defines the feed or feeds of interest to the subscriber; in general, a subscriber is interested in feeds coming from different contents providers. A subscriber may select those contents providers listed in the Provider Profiles Table 3-1 and determined by the administrator of the system. As an optional improvement, it may be provided that the users would be able to choose feeds not predetermined by the administrator of the system (through an appropriate procedure). For example, a subscriber may specify in his service subscription agreement that he is interested in receiving a news service comprising a piece of politics news extracted from feed "politics" (that corresponds to a portion of feed "politics") of provider A, a piece of sport news extracted from feed "sport" (that corresponds to a portion of feed "sport") of provider B, and a piece of cinema news extracted from feed "cinema" (that corresponds to a portion of feed "cinema") of provider C. In the subsequent text each portion of a selected feed will be referred as "item".

The aggregation format (definable by the subscriber) may specify what is the aggregation order of the various feed, which components of the feed are to be included in each message (e.g. audio only, audio and corresponding images, description text only, etc.), which of the most recent items (not yet provided to the subscriber) are to be included in each message, whether feeds are included in sequential format or by means of indexes etc. The presentation format (definable by the subscriber) may specify two different aspects relating to the way in which the subscriber benefits from the messages sent by the system.

The first aspect relates to the choreography, i.e. the space mode and the time mode to be used for displaying the multimedia items included in the messages. It can be chosen e.g. that for an item (comprised in a message) the item image is displayed on the whole screen of the mobile telephonic terminal while at the bottom of the screen the item text scrolls and the item audio is reproduced (i.e. emitted through a loudspeaker of the mobile telephonic terminal).

The second aspect relates to the way in which such information is described. There exist standard solutions (e.g. SMIL language based on XML language) as well as commercial solutions (e.g. Macromedia Flash) that describe the way in which multimedia content can be presented.

According to the present invention, advantageously, the subscriber has the possibility to define both aspects, i.e. the aspect relating to the choreography and the aspect relating to the description language.

At the subscription time, the subscriber could specify the mobile telephonic terminal (e.g. its manufacturer and model) that he intends to use for benefiting from the service; in this case, the system will be able to determine the most appropriate presentation format for the specified mobile telephonic terminal. Additionally or alternatively, this operation could be carried out dynamically; in this case, when the system is going to send a message to a subscriber (e.g. if the subscriber has not specified a mobile telephonic terminal), the system interrogates the mobile telephonic terminal currently used by the subscriber, determines the capabilities/features of that terminal, and consequently determines the most appropriate presentation format for that terminal.

The dispatch mode is basically either "as soon as possible" or "programmed". In "as soon as possible" dispatch mode, the system transmits contents as soon as this contents is received by the system from contents providers (if there is a subscriber who requested this contents). In "programmed" dispatch mode, the system transmits contents according to the requests of subscribers; in this case, a subscriber may specify in his service subscription agreements parameters such as reception frequency and reception time. For example, a first subscriber may specify that he would like to receive some first specific contents twice a day, the first time between 7:00 a.m. and 9:00 a.m., and the second time between 6:00 p.m. and 8:00 p.m., and a second subscriber may specify that he would like some second specific contents once a day not later than 10:00 p.m. or exactly at 9:00 p.m. Alternatively, for example, the subscriber can choose between a set of possibilities: "every day", "every working day", "weekend days", "every Monday", etc.

The dispatch mode may be related to the telecommunications network used for transmitting contents to the subscribers. The system according to the present invention may take also into account the data traffic load of the telecommunications network; this applies in particular with "programmed" dispatch mode as in the "as soon as possible" dispatch mode the system typically disregards this constraint.

A service condition may be specified by freely inputting data into a field of a record shown in a window. Alternatively, pre-defined ranges and/or pre-defined sets may be provided by the system in order to limit the choice of the user; according to a first example, "time reception" conditions may provide a "from" field wherein data between 18:00 and 22:00 are accepted by the system and a "to" field wherein data between 19:00 and 24:00 are accepted by the system; according to a second example, "time reception" conditions may provide a single field wherein only a choice within a set of pre-defined time intervals is accepted by the system, the set consisting e.g. of 7:00-9:00, 9:00-11:00, 11:00-13:00, 13:00-15:00, 15:00-17:00, 17:00-19:00.

The system according to the present invention may advantageously provide a set of pre-defined service subscription profiles; each service subscription profile is associated to a set of service conditions (or parameters); these conditions may comprise e.g. the contents bouquet, the aggregation format, the presentation format, the dispatch mode, etc.

In this case, a user decides which of the pre-defined service subscription profiles better meets his needs and then specifies his choice to the system. Therefore, the service subscription agreement for this subscriber may contain simply a reference to a service subscription profile; alternatively, the service subscription agreement of this subscriber would be a copy of the service subscription profile.

Service subscription profiles are stored in database 3, specifically in Subscriptions Table 3-4.

As it is clear from the above, the data structure adapted to store a service subscription agreement is identical (or almost identical) to the data structure adapted to store a service subscription profile; therefore, it is possible and advantageous to identify a common data structure for storing both service subscription agreements and service subscription profiles.

It is possible and advantageous that a system according to the present invention provides to the users both possibilities:
- to specify in detail the conditions of a service subscription agreement, and
- to specify a choice between a set of pre-defined service subscription profiles.

It is advantageous that, even in the case of pre-defined service subscription profiles, the subscriber may determine (and specify to the system) one or more service conditions relating to his own service subscription agreement; in this way, it is easier for the user to subscribe to a service while he maintains some possibility of customisation.

Interface module 12 is a component of system 0 that allows users to access system 0. In the embodiment of FIG. 1, users may access the system through the Web, i.e. internet, using both an HTTP protocol (e.g. by means of fixed computer terminal 9) and a WAP protocol (e.g. by means of mobile telephonic terminal 10).

It should be clear that interface module 12 is not used by the system to transmit the desired multimedia contents to the subscribers, but is used by users to interact with system 0.

This interaction serves to the user (that is not yet a subscriber) at least for subscribing to one of the services provided by system 0; it may be provided that the "signature" of the service subscription agreement is carried out electronically or on-paper or both. Actually, it cannot be excluded that the service provider gives the possibility to subscribe to his services using e.g. dedicated fixed terminals located in particular places, such as a network of shops having a business relationship with the service provider. These dedicated fixed terminals use advantageously interface module 12 in order to access system 0.

Through interface module 12 the user has the possibility to specify the conditions (or parameters) of the service subscription agreement; in the simplest case, the user has only to choose one of the pre-defined service subscription profiles.

In general, the user has the possibility to specify the desired contents that he would like to receive in aggregate format, the desired presentation format and the desired reception time.

Additionally, still through interface module 12, the user may input some information regarding its own profile (e.g. name, credentials such username and password, mobile telephone number of the terminal to be used for receiving the multimedia contents) and the type of mobile terminal that will be used for receiving the programme.

The information relating to the user profile is stored into database 3, specifically in User Profiles Table 3-2.

Interface module 12 may be a traditional Web interface or a traditional WAP interface (or a combination of both); such interfaces are known in the art and therefore no further details will be provided herein.

Provider Profiles Table 3-1 is a component of a database 3 and is used for storing information relating to contents providers. Some of such information identifies contents providers (such as name, Web address). Some of such information indicates how contents providers make contents available; in fact, in order to correctly, effectively and efficiently process contents from contents providers it is useful to know and keep stored at least the URL where the feed can be found. Specifically, information regarding publication methods stored in table 3-1 of database 3 comprises e.g. the standard used for creating the XML files (describing the published contents), the links for finding these files, the update frequency (e.g. periodical update or immediate update). Advantageously, such stored information match with the data structure defined by the used syndication standard.

Contents Retriever Module 4 provides a process in charge of identifying and collecting contents from contents providers 5 and then of storing and updating the repository of system 0 to this regard. This process can carry out his task using information relating to the contents providers stored in the repository of system 0, specifically in Provider Profiles Table 3-1.

Contents (particularly multimedia contents) is stored into database 3, specifically in Contents Table 3-3. Inside this table, there may be various updated contents (e.g. images, audio, video-clips and the corresponding descriptions) coming from the various feeds and the various contents providers. In this way, there may be stored e.g. the last video-clip published inside feed "Sport" by content provider CP1, the last photographs published inside feed "Fashion" by content provider CP2 and so on.

As already said, system 0 provides contents to subscribers in the form of messages, in an aggregated format and according to the requests of the subscribers. Typically and advantageously, system 0 sends a single message to a subscriber. Typically and advantageously, the message sent by system 0 has a variable length.

Scheduler Module 6 provides a process in charge of identifying the messages to be prepared and the dispatch time, e.g.

date and hour (referred in the following as "date/hour"), according to the various active service subscription agreements.

Scheduler Module 6 updates information in Subscriptions Table 3-4 in order to label the identified service subscription agreements as "under preparation".

Contents Aggregator Module 7 provides a process in charge of dynamically determining the contents of the messages to be sent to subscribers (actually the subscribers' terminals) using the contents stored in the repository of system 0. Basically, contents is identified that can be considered "updated" according to the requests of the subscribers, afterwards, a message is prepared specifying the contents to be aggregated, the dispatch time, e.g. date and hour, and the destination.

By message it is meant a collection of pieces of information to be exchanged between the service provider and the user; the pieces of information can include items for the correct delivery (addressing, schedule information, status) and the content itself (the multimedia contents and their presentation schema).

The prepared messages are stored into database 3, specifically in Messages Table 3-5.

Dispatcher Module 8 provides a process in charge of physically creating messages and of dispatching them. This requires that module 8 be designed to manage the communication with the subscriber's terminal (in FIG. 1, as a much simplified example, only one terminal 10 is shown in communication with module 8). To this regard, a server process, corresponding to module 8, may be identified within system 0 a client module 11 may be identified within subscriber's terminal 10; when system 0 communicates with terminal 10 both processes are active.

The assembling of each message is carried out according to the assembling rules associated to the service subscription agreement stored in the repository of system 0; such rules provides e.g. the spatial and temporal arrangement to be used by the subscriber's terminal for presenting contents to the subscriber (for example an XML description of the SMIL type could be used).

The dispatch of the message to the subscriber is typically carried out according to the following sequence:
notifying to the client process that a message is available,
receiving from the client process confirmation of availability to receive a message,
sending a message to the client process.

When the client process sends his availability confirmation, it may also send e.g. an XML file describing the characteristics of the receiving terminal (e.g. maximum packet size, types of recognisable media). Based on this information, the server process may apply some transcoding for making the message to be transmitted compatible with the reception terminal.

In the following a detailed description will be provided of the processes directly involved with messages, according to the specific embodiment of the present invention shown in FIG. 1, with reference to FIG. 2, FIG. 3, FIG. 4 and FIG. 5. According to this embodiment, to each of the software modules of FIG. 1 corresponds only one process.

The modules/processes involved in the message creation are:
Contents Retriever (4): it contains the logic used in updating contents; additionally, it signals the possibility to create messages for those subscribers who requested "as soon as possible" dispatch mode; (FIG. 2)
Scheduler (6): it contains the logic used in managing the request of creation of messages based on the scheduling requested by the subscribers; it activates a request only for those subscribers who requested "programmed" dispatch mode; (FIG. 3)
Contents Aggregator (7): it contains the logic used in managing the creation of messages; identifies messages for which contents are already available and prepares them for the Dispatcher; (FIG. 4)
Dispatcher (8): it contains the logic used in governing the dispatch of messages; it deals with determining the message dispatch time, e.g. date and hour, and with transmitting the messages. For messages in "as soon as possible" mode, the transmission of the message is to be carried out as soon as the message is ready. For message in "programmed" mode, the system may take into account in addition to the time requested by the subscriber, factors such as the policies associated to the subscription agreement or the availability of the network; (FIG. 5) each of these processes, after having carried out a processing cycle, enters an idle state for a period of time (the length of this period may be fixed or variable depending on the way the present invention is implemented—the managing of concurrent processes is done according to what is known in the field of computers); at the end of this idle period, each process checks whether the status of database 3 is changed and, if necessary, it does some processing.

As already said, the service and architecture according to FIG. 1 require that the contents providers publish their information preferably according to a Web syndication protocol (e.g. RSS or Atom), therefore as a particular XML file comprising tags for information about its content; such information comprises general information about its content (e.g. title, description, author), about the frequency of updating its content, and about the type and size of multimedia files corresponding to its content or to an attachment to its content.

Contents Retriever

Figure 2:
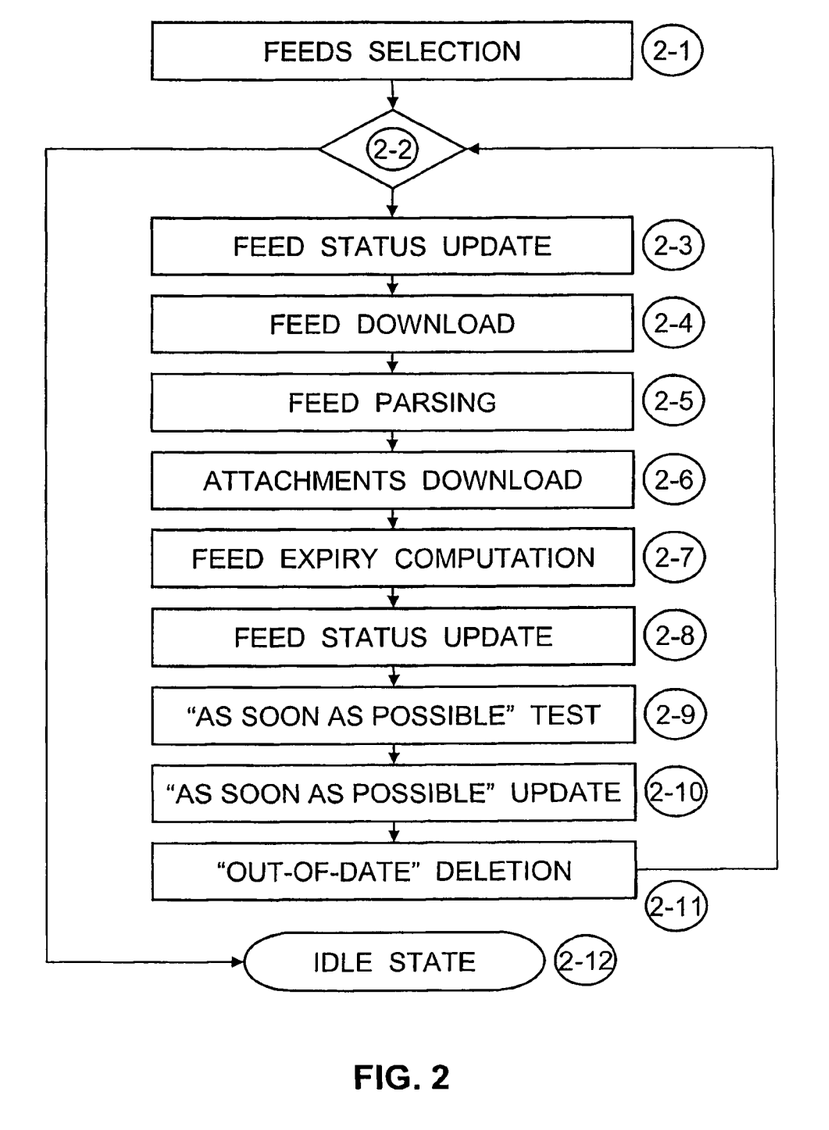
FIG. 2 shows a flow chart relating to the activities carried out by a process corresponding to the Contents Retriever Module 4 of FIG. 1.

The Contents Retriever process 4 is the process that is in charge of identifying and keeping updated in database 3 the contents made available by each contents provider 5. Knowing the update frequency of the single contents of the contents providers 5 and the requests by the subscribers, this process requests the download of the feeds of interest, and then it parses them and store them into database 3.

Furthermore, it manages the message dispatch date/hour that are requested with "as soon as possible" dispatch mode.

The steps carried out by this process are shown as a flow diagram in FIG. 2 and are described in the following.

Step 2-1: identifies all the feeds meeting the following conditions:
the feed is still active (still managed and updated by a contents provider);
the feed stored in repository 3 is no longer updated (the expiry date of the validity of the feed has been passed);
the feed is requested by at least one subscriber (the feed belongs to at least one active subscription agreement);
in this way, those feeds are identified that need to be downloaded and stored.

Step 2-2: is the test for a routine that is repeated for all the feeds identified at step 1.

Step 2-3: provides that the status relating to the feed is updated in order to avoid access problems due to a concurrent access to the same feed by more than one process.

Step 2-4: provides that a download is carried out of the XML/RDF file (e.g. a RSS or Atom file) corresponding to the feed.

Step 2-5: parses the feed, extracts the information to be stored into repository 3, and determines the need of further downloading activity for the multimedia files attached to the feed (e.g. images and enclosures, in case of RSS format).

Step 2-6: provides for downloads of any multimedia file attached to the feed.

Step 2-7: provides that, based on the value of some data fields of the XML file, the expiry date of the validity of the feed is computed.

Step 2-8: provides that the status relating to the feed is updated again for allowing future accesses to the same feed.

Step 2-9: checks whether there exist active subscription agreements that request the feed with "as soon as possible" mode.

Step 2-10: provides that, for these subscriptions, its status is changed in order to signal to the Scheduler process that the contents requested according to the subscription agreement is available.

Step 2-11: provides that all the items considered out-of-date are deleted (e.g. older than one week).

Step 2-12: provides that the process enters idle state for a predetermined period of time (typically some seconds).

Scheduler

Figure 3:
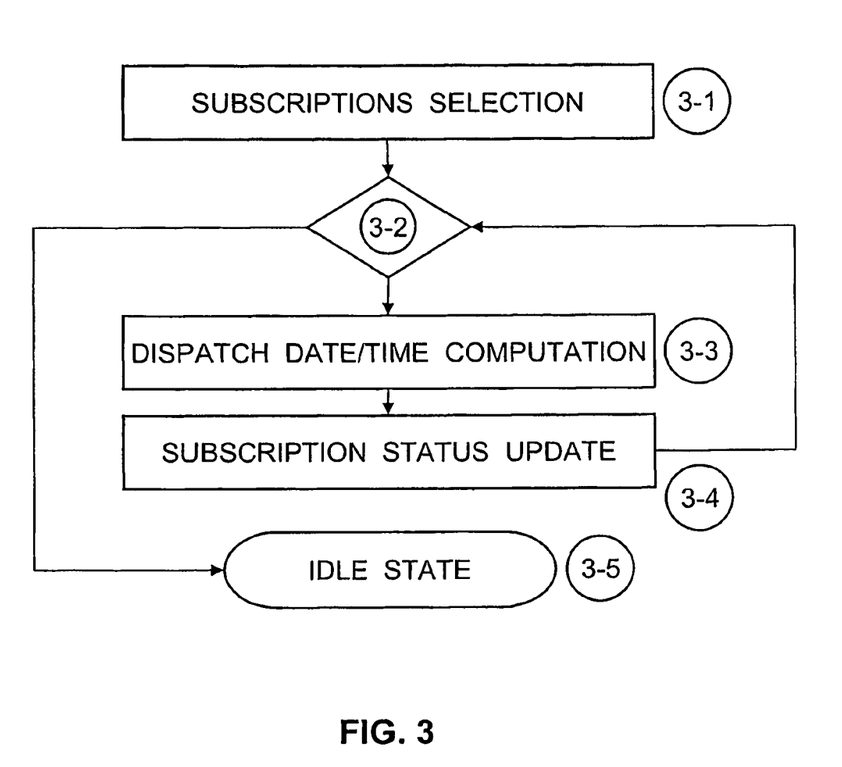
FIG. 3 shows a flow chart relating to the activities carried out by a process corresponding to the Scheduler Module 6 of FIG. 1.

The Scheduler process 6 is the process that is in charge of determining when to send the contents requested by the subscribers. This process is activated by an own timer and processes only the service subscription agreements implying "programmed" dispatch mode; on the basis of the subscriber's scheduling, it determines the date/hour limit for preparing the next message.

The steps carried out by this process are shown as a flow diagram in FIG. 3 and are described in the following.

Step 3-1: identifies all the subscription agreements that require the creation of new messages, i.e. that has the following characteristics:
- they are "programmed" mode;
- they are still active;
- their message requested reception date/hour is expired;
- they are not yet dealt with (i.e. their message is not yet in preparation).

Step 3-2: is the test for a routine that is repeated for all the subscription agreements identified at step 1.

Step 3-3: determines the date/hour of the next message to be sent to the subscriber on the basis of his requests.

Step 3-4: updates the status of the subscription agreement labelling it as "under preparation".

Step 3-5: provides that the process enters the idle state for a predetermined period of time (typically some seconds).

Contents Aggregator

Figure 4:
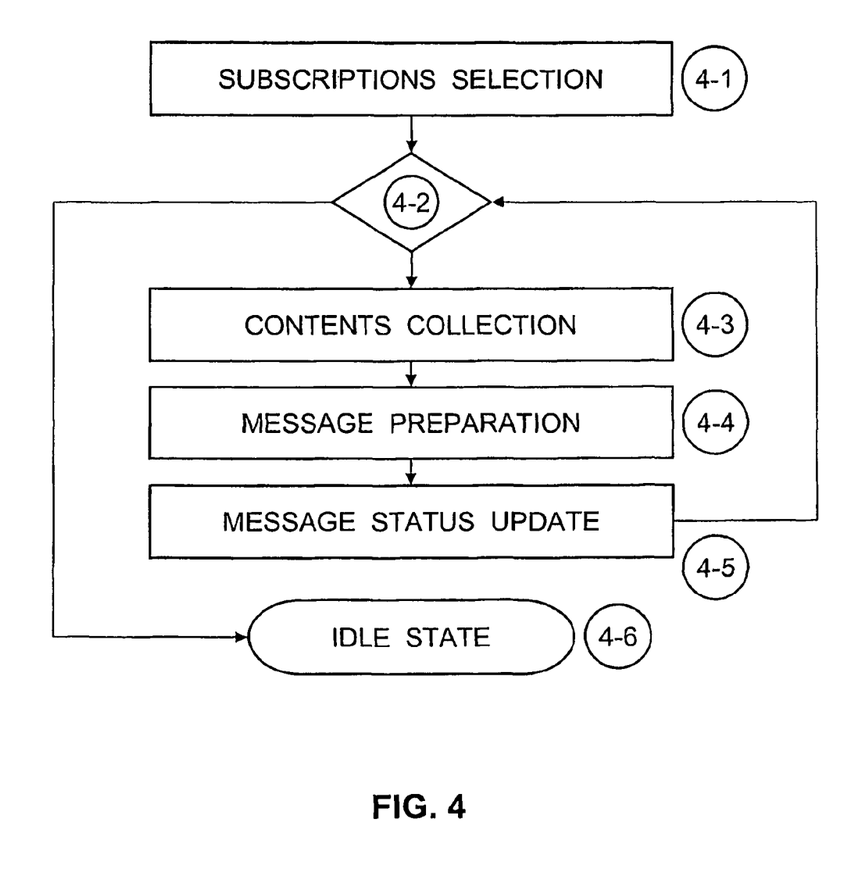
FIG. 4 shows a flow chart relating to the activities carried out by a process corresponding to the Contents Aggregator Module 7 of FIG. 1.

The Contents Aggregator process 7 is the process that is in charge of determining which of the service subscription agreements under preparation have all the necessary elements for their creations; then, it provides to prepare the messages to be sent to the subscribers.

All the messages under preparations should be created for which between the actual date/hour and the requested reception date/hour there is no expiry date of the feed that comprises them. In fact, the process may face the following situations:

all the update dates/hours of the feed fall beyond the requested reception date of the message; in this case, it is possible to create the message as all the information comprised in it are already available (none of the update dates/hour fall within the identified interval as they are all subsequent to the requested reception date/hour of the message);

some feeds comprised in the message expire before the request reception date/hour of the message while other feeds expire after; in this case, it should be waited "as long as possible", till when the last feed has been downloaded that precedes the requested reception date/hour of the message; this happens just when the proposed condition is verified (none of the expiry dates/hours fall between the actual date/hour of the analysis and the requested reception date/hour of the message);

all the feeds fall before the expiry date/hour of the feed; in this case, it should be waited till when the last feed has been downloaded (as in the preceding point).

As regards the messages in "as soon as possible" dispatch mode, these can be transmitted without any further check as the message creation date/hour has been fixed by the Contents Retriever process (4) after the correct download of the feeds. Therefore, for sure, the feeds are updated and the message can be transmitted.

The steps carried out by this process are shown as a flow diagram in FIG. 4 and are described in the following.

Step 4-1: identifies all the messages that have to be prepared for their transmission. The conditions for identifying these messages are the following:

"as soon as possible" mode: in this case, as the message request has been provided by Contents Retriever process at the end of the feed download cycle, it is certain that the feed is correctly updated and therefore no check is necessary;

"programmed" mode: all the "under preparation" messages are identified that:
- all the corresponding feeds are updated,
- none of the feed expiration dates/hours fall between the actual date/hour and the message requested reception date/hour.

Step 4-2: is the test for a routine that is repeated for all messages identified in step 1.

Step 4-3: for each identified message, collects the elements that will compose the message; for each feed, there should be taken all the elements that have a publication date/hour subsequent to the last created message. If there are no new elements, a void message will be created (it will be the task of the Dispatcher process to decide whether to transmit the void message or to provide some appropriate signalling to the subscriber).

Step 4-4: provides that the new message is stored into the Message Table 3-5 with the following information:
- identifier of the corresponding subscription agreement,
- date/hour of message requested reception,
- indication of the elements comprised in the message.

Step 4-5: updates the status of the message for indicating that it is ready.

Step 4-6: provides that the process enters the idle state for a predetermined period of time (typically some seconds).

Dispatcher

Figure 5:
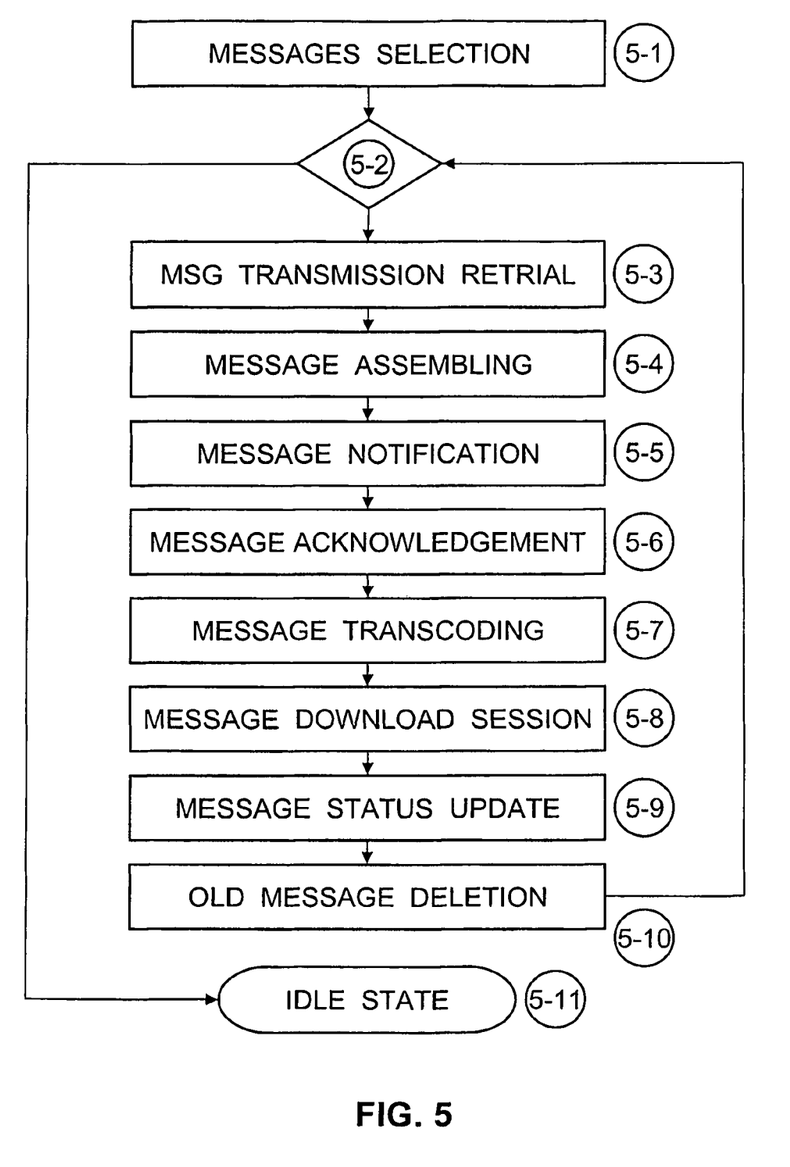
FIG. 5 shows a flow chart relating to the activities carried out by a process corresponding to the Dispatcher Module 8 of FIG. 1.

The Dispatcher process 8 is the process that is in charge of identifying the messages stored in database 3 that are ready to be transmitted to the subscriber and, on the basis of the contained indications, generating the messages and all the interactions steps with the client process on the subscriber's mobile terminal till when delivery is successfully completed. If necessary, this process may also activate contents transcoding procedures. It is in this process that there may be taken into account the constraints set by the telephonic operator; in fact, in case of "as soon as possible" dispatch mode the transmission should be carried out immediately, but in case "programmed" dispatch mode the process may operate according to different criteria e.g. the following four:

a message is transmitted as soon as available, irrespective of the date/hour requested by the subscriber or by other external conditions;

a message is transmitted at any time before the date/hour requested by the subscribers, identifying those periods when the network is not too loaded;

a message is transmitted preferably during certain time intervals of the day (for example during the night);

a message is transmitted exactly on the time requested by the subscriber.

The steps carried out by this process are shown as a flow diagram in FIG. 5 and are described in the following.

Step 5-1: identifies all the messages that should be transmitted according to the dispatching policy.

For example, two different dispatching policies are set out in the following:

a) the messages are transmitted as soon as they are available; in this case, it is sufficient to identify of the ready messages;

b) the messages are transmitted on the date/hour requested by the subscriber; in this case, there are identified all the messages ready and having a requested reception date/hour already expired.

It is to be noted that, in both cases, the messages requested in "as soon as possible" mode are always identified. Policy "a" may be suitably complicated by introducing a check on the data traffic load of the network on the current time.

Step 5-2: is the test for a routine that is repeated for all messages identified in step 1.

Step 5-3: takes care, according to a management policy, of any preceding message that failed considering e.g. a maximum retrial number or a maximum retrial period of time.

Step 5-4: on the basis of the indicated aggregation rules and of the requested contents, assembles a message to be transmitted.

Step 5-5: notifies to a client process in the subscriber's mobile telephonic terminal the presence of a message ready to be transmitted.

Step 5-6: receives from the client process the acknowledgment of the message and information relating to the type of terminal that is going to receive the message.

Step 5-7: manages any transcoding in case of compatibility problems between the message that is going to be transmitted (specifically its contents) and the receiving terminal.

Step 5-8: activates a download session to transfer the message from the server to the client.

Step 5-9: updates the status of the message marking it with the result of the transmission and the transmission details (e.g. date and hour).

Step 5-10: deletes the preceding message transmitted to the user (therefore only one message for each user is stored in repository 3, i.e. the latest)

Step 5-11: provides that the process enters the idle state for a predetermined period of time (typically some seconds).

The invention claimed is:

1. A method of automatically providing contents and multimedia contents by a service provider to mobile telephonic terminals of service subscribers comprising:

storing service subscription agreements information in a repository of the service provider for each subscriber, said information comprising service conditions desired by each subscriber, said service conditions comprising specification of contents desired by each subscriber; and providing contents and multimedia contents to mobile telephonic terminals in push mode according to the conditions desired by each subscriber, wherein each service subscription agreement comprises pieces of information for specifying different sources of contents and multimedia contents, wherein contents and multimedia contents from the sources specified by each service subscription agreement are aggregated into one message at said service provider before being sent to the mobile telephonic terminal of the service subscriber; and wherein said service conditions further comprise aggregation format information and presentation format information specified by each subscriber, the aggregation format information comprising a content component selection for each source of content and multimedia content, and the presentation format information comprising choreography information pertaining to the content component selections;

wherein choreography information contains a space mode and a time mode.

2. The method according to claim 1, wherein a subscriber stores a set of service conditions in said repository relating to his own service subscription agreement.

3. The method according to claim 1, wherein a set of pre-defined service subscription profiles are provided, service subscription profiles information being stored in said repository for each service subscription profile, said information comprising service conditions, and said service conditions comprising specification of contents and multimedia contents; and wherein a subscriber stores a reference to one service subscription profile of said set into said repository.

4. The method according to claim 3, wherein a subscriber stores one or more service condition into said repository relating to his own service subscription agreement.

5. The method according to claim 3, wherein, for at least one service condition, a pre-defined range or a pre-defined set of values is provided, and wherein service subscribers may choose one of said values for said at least one service condition.

6. The method according to claim 1, wherein a set of pre-defined service subscription profiles are provided; and service subscription profiles information is stored in said repository for each service subscription profile, said information comprising service conditions, and said service conditions comprising specification of contents and multimedia contents; and wherein a subscriber stores a copy of one service subscription profile of said set in said repository.

7. A system for automatically providing contents and multimedia contents, to mobile telephonic terminals of service subscribers comprising an adaptation for implementing the method according to claim 1, and comprising a repository for storing at least service subscription agreements information.

8. The system according to claim 7, comprising an adaptation to aggregate contents from different sources specified in one message before providing the message to a subscriber.

9. The system according to claim 7, wherein said repository is realized as a database comprising a set of tables and is managed by the system.

10. The system according to claim 7, further comprising a set of software modules adapted to communicate therebetween using said repository.

11. The system according to claim 7, further comprising a contents retriever module for automatically collecting content and multimedia content from content and multimedia content providers.

12. The system according to claim 11, wherein said database comprises a table for storing content and multimedia content collected from content and multimedia content providers.

13. The system according to claim 11, further comprising a scheduler module for identifying messages for subscribers to be prepared, said messages comprising content and multimedia content in aggregate format.

14. The system according to claim 13, further comprising a contents aggregator module for preparing the messages for subscribers.

15. The system according to claim 14, wherein said database comprises a table for storing prepared messages.

16. The system according to claim 14, further comprising a dispatcher module for creating and delivering messages for subscribers to mobile telephonic terminals.

17. The system according to claim 11, further comprising a user interface module for allowing a user to specify service conditions to the system.

18. The system according to claim 17, wherein said database comprises a table for storing service subscription agreements information comprising service conditions.

19. The system according to claim 18, wherein a table of said repository is adapted to store both service subscription agreements information and service subscription profiles information.

20. The system according to claim 17, wherein said user interface module is adapted to communicate with a user terminal using HTTP and/or WAP protocol.

21. The system according to claim 11, further comprising an administrator interface module for allowing an administrator to manage the system and to define content and multimedia content provider profiles.

22. The system according to claim 7, wherein said database comprises a table for storing content and multimedia content provider profiles.

* * * * *

UNITED STATES PATENT AND TRADEMARK OFFICE
CERTIFICATE OF CORRECTION

| | |
|---|---|
| PATENT NO. | : 8,433,301 B2 |
| APPLICATION NO. | : 12/086386 |
| DATED | : April 30, 2013 |
| INVENTOR(S) | : De Bonis et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1172 days.

Signed and Sealed this
Eighteenth Day of November, 2014

Michelle K. Lee
*Deputy Director of the United States Patent and Trademark Office*